UNITED STATES PATENT OFFICE.

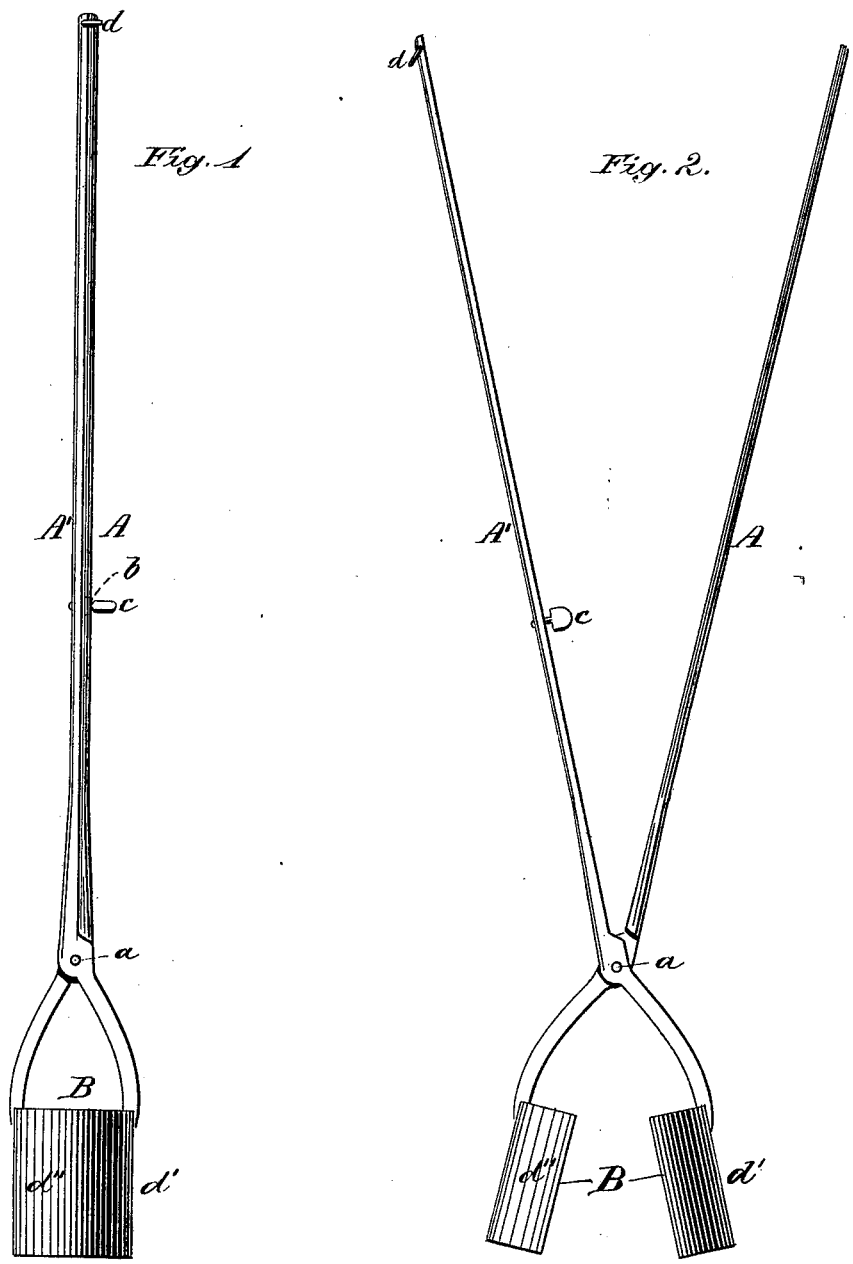

JOHN J. ARMSTRONG, OF TEXANA, TEXAS.

IMPROVEMENT IN POST-HOLE DIGGERS.

Specification forming part of Letters Patent No. 197,308, dated November 20, 1877; application filed June 4, 1877.

*To all whom it may concern:*

Be it known that I, JOHN J. ARMSTRONG, of Texana, in the county of Jackson and State of Texas, have invented certain new and useful Improvements in Post-Hole Diggers; and I do hereby declare that the following is a full, clear, and exact description thereof, which will enable others skilled in the art to which it appertains to make and use the same, reference being had to the accompanying drawings, which form a part of this specification, and in which—

Figure 1 is a side elevation, showing my improved post-hole digger closed; and Fig. 2, a similar view, showing it open.

Similar letters of reference indicate corresponding parts in both the figures.

My invention relates to post-hole borers or diggers; and it consists in an improved construction of implements of this class, substantially as hereinafter more fully described, and pointed out in the claim.

In the drawing, A A' are the two parts of the operating rod or handle, which are pivoted together at $a$. Rod A has a slot, $b$, about midway, and rod A' has a pivoted catch-lug, $c$, which fits into the slot $b$, and also a bail or keeper, $d$, hinged to its top, which fits over the top of the opposite rod A, so as to secure the two in place when folded together for digging the hole, as shown in Fig. 1.

The drill or auger B is made in two pieces, $d'$ and $d''$, each semi-cylindrical in shape, so that the two, when brought together, will form a complete cylinder. When these parts and the operating-rods A A' are in the closed position represented in Fig. 1, the digger is ready for boring the hole. After one round or depth has been reached, by striking or ramming the implement into the ground, (the earth being retained between the jaws $d'$ $d''$,) it is, when the jaws are full, withdrawn from the hole thus made, and the dirt contained between the cutter-jaws removed by opening them out from each other, when it will drop out. The digger is then again folded and re-inserted into the hole, when the operation of ramming it down is repeated. When the cylinder formed by the cutters has been charged with dirt, it is withdrawn and emptied a second time, and so on until a hole of the desired depth has been obtained.

I am aware that the several parts forming my invention—the pivoted handles, the loop $d$, and the catch $c$—are not new, separately considered; but by combining them in the manner described a tool is formed which possesses the qualities of strength, lightness, durability, and convenience for handling in a pre-eminent degree. Therefore,

Having thus described my improvement, I claim and desire to secure by Letters Patent of the United States—

The improved post-hole digger herein described, consisting of the arms A A', the former having slot $b$, pivoted at $a$, and lying, when closed, close together from their pivoting-point upward, the said arms being semi-circular in their horizontal cross-section, bail or loop $d$, catch-lug $c$, and semi-cylindrical augers or cutters $d'$ $d''$, all combined, arranged, and operating substantially in the manner herein shown, for the purpose set forth.

In testimony that I claim the foregoing as my own I have hereto affixed my signature in presence of two witnesses.

JOHN JOSHUA ARMSTRONG.

Witnesses:
W. WOOD,
WILLIE A. MATTHEWS.